United States Patent
Etō et al.

[11] Patent Number: 6,134,918
[45] Date of Patent: Oct. 24, 2000

[54] METHOD OF FABRICATING GLASS SUBSTRATE FOR MAGNETIC DISK AND METHOD OF FABRICATING MAGNETIC DISK

[75] Inventors: Nobuyuki Etō ; Koji Takahashi, both of Yamanashi; Shinji Eda, Nirasaki, all of Japan

[73] Assignee: Hoya Corporation, Tokyo, Japan

[21] Appl. No.: 08/999,480

[22] Filed: Dec. 29, 1997

[30] Foreign Application Priority Data

Dec. 29, 1996 [JP] Japan ..................................... 8-359152
Dec. 29, 1996 [JP] Japan ..................................... 8-359287

[51] Int. Cl.$^7$ .................................................. C03C 21/00
[52] U.S. Cl. ............................................. 65/30.14; 65/31
[58] Field of Search ................................. 65/30.1, 30.14, 65/60.1, 60.5, 31

[56] References Cited

U.S. PATENT DOCUMENTS

| | | | |
|---|---|---|---|
| 3,656,922 | 4/1972 | Budd | 65/30.1 |
| 3,873,344 | 3/1975 | Church et al. | 427/380 |
| 5,654,057 | 8/1997 | Kitayama et al. | 428/64.1 |
| 5,804,317 | 9/1998 | Charrue | 428/410 |

FOREIGN PATENT DOCUMENTS

| | | |
|---|---|---|
| 2-285508 | 11/1990 | Japan . |
| 7-191529 | 7/1995 | Japan . |
| 94/26675 | 11/1994 | WIPO . |

OTHER PUBLICATIONS

Abstract, JPO, Kojima, Takeshi, JP 9–22525A, Jan. 1997.

*Primary Examiner*—Sean Vincent
*Attorney, Agent, or Firm*—Frishauf, Holtz, Goodman, Langer & Chick, P.C.

[57] ABSTRACT

The surface of a glass substrate withdrawn from a chemically strengthening treatment liquid is processed with a heated acid (for example, a thermal concentrated sulphuric acid at a temperature of over 100° C., or a water soluble organic solvent such as glycerol or polyethylene glycol). Consequently, precipitated fused salt can be effectively removed without damaging the glass substrate and the change in quality of the glass surface can be also prevented at a high level.

14 Claims, No Drawings

METHOD OF FABRICATING GLASS SUBSTRATE FOR MAGNETIC DISK AND METHOD OF FABRICATING MAGNETIC DISK

REFERENCE TO RELATED APPLICATION

This application claims the priority right of Japanese Patent Applications Nos. Hei 08-359152 and Hei 08-359287 filed on Dec. 29, 1996, the entire disclosure of which is incorporated herein by reference

BACKGROUND OF THE INVENTION

1. Field of the Invention

The present invention relates to a method of fabricating a glass substrate for a magnetic disk which is used as a hard disk and a method of fabricating a magnetic disk.

2. Description of the Related Arts

An aluminum substrate is conventionally often used as a substrate for a magnetic disk. In association with demands of reduction in size and thickness of the magnetic disk and lower floating of a magnetic head, the ratio of using a glass substrate is being increased since the reduction in size and thickness of the glass substrate is easier, flatness is higher, the floating of the magnetic head is lower, and the like as compared with the aluminum substrate.

When the glass substrate is used as a substrate for a magnetic disk, a chemical strengthening treatment by a low-temperature ion exchange is generally performed to the surface of the glass substrate in order to improve impact resistance and vibration proof thereby to prevent the substrate from being damaged by impact or vibration.

Since fused salt is adhered to the chemically strengthened glass substrate, a cleaning process is also performed. Hitherto, the glass substrate for the magnetic disk after the chemical strengthening treatment is cleaned by using, for example, as described in Japanese Patent Application Laid-Open Hei 2-285508, alkaline cleaning agent, pure water, organic solvent, and the like.

In association with increase in recording density of the magnetic disk, a distance (spacing) between the magnetic disk and the magnetic head is requested to be narrowed more and more. It is, therefore, an urgent subject to completely remove foreign matters on the glass substrate which cause projections on the surface of the magnetic disk.

Although changes in quality (Dimming, Staining, Surface Deterioration, Chemical Durability, Chemical Durability to water and the like) of the surface of the glass substrate occurring before and after formation of a magnetic film or the like on the glass substrate also depend on surface cleanliness by the cleaning process and outer atmosphere, they have close relation with the kind and concentration of ion in the surface layer of the glass substrate. They exert influences on weather resistance and the life under operation environment of the magnetic disk and the reliability of the magnetic disk.

Although a predetermined cleaning effect can be obtained by the above-mentioned conventional cleaning treatment, even if the cleaning treatment is especially performed to the glass substrate withdrawn from the chemical strengthening treatment liquid, it is difficult to completely remove precipitated fused salt remained on the glass substrate.

The conventional cleaning treatment is insufficient to prevent the changes in quality of the glass surface such as burning and the like at a high level.

SUMMARY OF THE INVENTION

In view of the above problems, it is an object of the invention to provide a method of fabricating a glass substrate for a magnetic disk and a method of fabricating a magnetic disk, which can effectively remove precipitated fused salt without damaging a glass substrate and prevent changes in quality of the glass surface at a high level.

It is another object of the invention to provide a method of fabricating a glass substrate for a magnetic disk and a method of fabricating a magnetic disk, which can effectively prevent dissolution of alkali ions such as $Na^+$ from a glass substrate contained in the glass substrate.

In order to achieve the object, the inventors of the present invention have made progress in the study, and consequently developed a technique of effectively removing precipitated fused salt by cleaning the surface of a glass substrate withdrawn from a chemically strengthening treatment liquid with a cleaning agent containing an acid, without damaging the glass substrate. The technique was already applied for a patent (Japanese Patent Application Laid-Open No. Hei 7-191259).

As a result of further study, a fact was found such that in order to prevent the change in quality of the glass surface at a high level, the temperature and concentration of the acid are the keys, and it is effective when the glass surface is processed with a heated acid (especially, a thermal concentrated sulfuric acid at over 100° C. or a heated water soluble organic solvent such as glycerol, polyethylene glycol, or the like). Consequently, the invention was completed.

The reason why the change in quality of the glass surface can be prevented at a high level by processing the glass surface with the heated acid or the water soluble organic solvent is considered as follows. $Na^+$ of Si—O—Na is ion exchanged for hydronium ions and the glass surface is changed from a non-bridging state of Si—O—Na to a hydration state. After that silanol group is dehydrated by the heating ($\equiv$Si—O$^-$Na$^+$+H$^+$→$\equiv$Si—OH (silanol)+Na$^+$) the bridging of Si—O—Si is realized on the glass surface ($2\equiv$Si—OH→Si—O—Si+H$_2$O).

A method of fabricating a glass substrate for a magnetic disk according to the invention includes: a step of chemically strengthening a glass substrate by immersing the glass substrate in a heated chemically strengthening treatment liquid and performing an ion exchange of exchanging ions in a surface layer of the glass substrate for ions in the chemically strengthening treatment liquid; and a step of processing the surface of the glass substrate withdrawn from the chemically strengthening treatment liquid with a heated acid or a water soluble organic solvent.

According to a method of fabricating a glass substrate for a magnetic disk of the invention, when the heated acid is used, a heating temperature of the heated acid is a temperature at which elution of alkali ions near the surface of the glass substrate can be suppressed, the heating temperature of the heated acid lies in a range from 40° C. to a glass transition point, the heating temperature of the heated acid lies in a range from 80° C. to 300° C., the heating temperature of the heated acid lies in a range from over 100° C. to 300° C., a processing time with the heated acid is from one minute to two hours, the heated acid is either a thermal concentrated sulfuric acid, a thermal concentrated sulfuric acid at over 100° C. having the concentration of 96%, or an acid including sulfuric acid and/or phosphoric acid, the sulfuric acid and/or phosphoric acid include(s) hydrogen peroxide, the chemically strengthening treatment liquid is heated to a temperature of a melting point of salt or higher to thereby chemically strengthening the glass substrate, the glass substrate is withdrawn from the liquid, gradually cooled to 300° C. to 150° C., and is come into contact with a refrigerant to be quickly cooled, and then a process using the heated acid is performed, or the glass substrate for the magnetic disk is the glass substrate used for a magnetic disk which is reproduced by a magnetoresistive head.

When a heated water soluble organic solvent is used, a water soluble organic solvent is either glycerol or polyethylene glycol, a heating temperature of the water soluble organic solvent is a temperature at which elution of alkali ions near the surface of the glass substrate can be suppressed, the heating temperature of the water soluble organic solvent lies in a range from 80° C. to 240° C., the heating temperature of the water soluble organic solvent lies in a range from 120° C. to 240° C.

a processing time with the heated acid is from one minute to one hour, or the glass substrate for a magnetic disk is used for a magnetic disk which is reproduced by a magnetoresistive head.

Further, according to a method of fabricating a magnetic disk of the invention, at least a magnetic layer is formed on the glass substrate for the magnetic disk obtained by using the abovementioned method of fabricating the glass substrate for the magnetic disk.

According to the invention, since the glass substrate withdrawn from the chemically strengthening treatment liquid is processed by the heated acid or the water soluble organic solvent, the precipitated fused salt can be effectively removed without damaging the glass substrate.

Simultaneously, by controlling the temperature and concentration of the heated acid or the water soluble organic solvent, the change in quality of the glass surface can be prevented at a high level.

Further, according to the method of fabricating the magnetic disk of the invention, since the glass substrate for the magnetic disk having the surface from which precipitated fused salt is completely removed and which has no fine defects caused by a damage on the glass substrate is used, a high-quality magnetic disk with little defects can be manufactured at the high yielding. Since the glass substrate for the magnetic disk which can prevent the change in quality of the glass surface at a high level is used, a very reliable magnetic disk having excellent weather resistance and the long life can be fabricated.

Since the removal of the precipitated fused salt and the prevention of the change in quality of the glass surface can be performed in one processing step, the efficiency of the process is very high.

DESCRIPTION OF THE PREFERRED EMBODIMENTS

In a method of fabricating a glass substrate for a magnetic disk according to the invention, a glass substrate is first immersed in a heated chemical strengthening treatment liquid and an ion exchange is performed by exchanging ions in the surface layer of the glass substrate for ions in the chemical strengthening treatment liquid, thereby chemically strengthening the glass substrate.

Low-temperature ion exchange method, high-temperature ion exchange method, a surface crystallizing method, dealkalline method for the glass surface, and the like are known as the ion exchange methods. It is preferable to use the low-temperature ion exchange method from the viewpoint of glass-transition point (softening of glass).

According to the low-temperature ion exchange method, alkali ions each having a larger ionic radius are substituted for alkali ions in the glass in a temperature range lower than the glass transition temperature (Tg), and a strong compressive stress is caused in the glass surface layer by increase in capacity of the ion exchange part, thereby strengthening the glass surface.

As chemical strengthening treatment liquids, a fused salt such as potassium nitride ($KNO_3$), sodium nitride ($NaNO_3$), or potassium carbonate ($K_2CO_3$), a fused salt obtained by mixing the above salts (for example, $KNO_3+NaNO_3$, $KNO_3+K_2CO_3$, or the like), a fused salt obtained by mixing an ionic salt such as Cu, Ag, Rb, Cs, or the like into the above salts, and the like can be mentioned.

Preferably, the heating temperature lies in a range from 350 to 650° C., more preferably 350 to 500° C., and further more preferably 350 to 450° C. from the viewpoint of the glass transition point.

Preferably, the immersing time lies in a range about from 1 to 20 hours from the viewpoint of transverse strength and the compressive stress layer.

It is preferable to set the thickness of the compressive stress layer formed on the surface layer of the glass substrate lies in a range about from 60 to 300 μm from the viewpoint of improvement of impact resistance and vibration proof.

In order to prevent a crack or the like of the glass substrate, it is preferable to preheat the glass substrate to 200 to 350° C. before the glass substrate is immersed in the fused salt.

Preferably, the glass substrate is chemically strengthened by holding it with the side faces in a chemical strengthening step, so that the whole surface of the glass substrate can be chemically strengthened.

In the invention, it is preferable to withdraw the glass substrate from the chemical strengthening treatment liquid after the chemical strengthening process and to slowly cool it to a predetermined temperature so that occurrence of thermal distortion can be suppressed. By the slow cooling, a damage caused by the thermal distortion can be avoided.

The speed to slowly cool the glass substrate preferably ranges from 2° C./minute to 100° C./minute, more preferably from 5° C./min. to 60° C./min., and further more preferably from 10° C./min. to 50° C./min.

In the invention, after the slow cooling, it is preferable to quickly cool the glass substrate, for example, at a speed which checks crystallization of the fused salt which is precipitated on the surface of the glass substrate. When the glass substrate is quick-cooled as mentioned above, the precipitated fused salt becomes weak, so that the fused salt can be easily removed in a processing step using a heated acid or a water soluble organic solvent and in a following cleaning step which will be described hereinlater.

Preferably, the speed to quick-cool the glass substrate lies in a range from 1,600° C./min. to 200° C./min, more preferably from 1,200° C./min. to 300° C./min., and further more preferably from 800° C./min. to 400° C. min.

It is preferable to quick-cool the glass substrate by allowing the glass substrate to come into contact with a refrigerant at 100° C. to 0° C., more preferably at 40° C. to 10° C. from the viewpoint of heat shock (defective discrimination).

It is preferable that time for allowing the glass substrate in contact with the refrigerant is about 10 to 60 minutes from the viewpoint of cleaning performance of the precipitated fused salt.

As refrigerants, a liquid refrigerant such as water, warm water, solvent, or the like, a gas refrigerant such as gaseous nitrogen, steam, cooling air, or the like, spraying of air, and the like can be mentioned.

It is a feature of the invention that the surface of the glass substrate after the chemical strengthening process is processed with a heated acid or a water soluble organic solvent.

In this case, by controlling the kind, temperature, concentration, and the like of the heated acid or water soluble organic solvent, the precipitated fused salt adhered on the glass substrate can be removed and the glass surface which can prevent the changes in quality of the glass substrate at a high level can be obtained.

The water soluble organic solvent is easily removed since it is water soluble, drainage does not cause a problem, and corrosion resistant equipment is unnecessary.

The reason why the change in quality (burning or the like) on the glass surface can be prevented at a high level by the process using the heated acid or the water soluble organic solvent is not completely clear. It is however considered that the glass surface changes from a non-bridging state of Si—O—Na to a hydration state when $Na^+$ of Si—O—Na is subjected to an ion exchange with hydronium ions, after that, silanol group is formed by heating and dehydration, the silanol group is dehydrated, and bridging of Si—O—Si is realized on the glass surface.

The heating temperature of the heated acid or the water soluble organic solvent may be a temperature at which elution of alkali ions near the glass substrate surface can be suppressed. The heating temperature of the heated acid is preferably in a range from 40° C. to about the glass transition point, more preferably, about 80° C. to 300° C., and further more preferably, over 100° C. to about 300° C.

When the heating temperature for the heated acid is low, the bridging of Si—O—Si is not realized on the glass surface, so that the quality of the glass surface is apt to be changed. When the heating temperature exceeds 300° C., since K ions in the glass substrate move to the inside the substrate, the strength of the glass substrate deteriorates.

When the heating temperature for the heated acid exceeds 100° C., the ability for preventing the change in quality of the glass substrate surface is increasingly improved.

The processing time by the heated acid is preferably about 1 minute to 2 hours. In case of using a thermal concentrated sulfuric acid, about 1 minute to 1 hour is preferable.

The process by using the heated acid is performed as follows. For example, the glass substrate is immersed in an acid such as the thermal concentrated sulfuric acid (for instance, a concentrated sulphuric acid having the concentration of 96% or higher), heated sulfuric acid, phosphoric acid, nitric acid, hydrofluoric acid, or hydrochloric acid, a mixed acid of mixture of the above acids, or a treatment liquid adding salt of the acid (ammonium fluoride, potassium nitrate, and the like) to the acids. In this case, the process can be also performed while applying supersonic waves.

Among the acids, the thermal concentrated sulfuric acid (for example, thermal concentrated euphoric acid having the concentration of 96% or higher at over 100° C.) or an acid including sulfuric acid and/or phosphoric acid is preferable from the viewpoint of removal of the precipitated fused salt and the prevention of the change in quality of the glass surface. In this case, since the effect of the process is improved, it is preferable to add hydrogen peroxide to the acid including sulfuric acid and/or phosphoric acid to generate heat by the reaction and execute the process.

In the process using the heated acid, it is also possible that a plurality of processing vessels of the same acid or different acids are provided and the glass substrate is sequentially immersed. In this case, the temperature and the concentration of the acid can be varied.

The concentration of acid is determined in consideration of the removal of the precipitated fused salt and the prevention of the change in quality of the glass substrate. The optimum concentration is different depending on acid to be used. For example, in case of using sulfuric acid, 50 wt % or higher is preferable and 95 wt % or higher is more preferable.

After the process using the heated acid, a known cleaning process can be also performed such as cleaning using a commercially available cleaning agent (neutral detergent, surface active agent, alkaline cleaning agent, or the like), scrubbing cleaning, pure water cleaning, solvent cleaning, solvent steam drying, centrifugation drying, or the like. In each cleaning, heating or application of supersonic waves may be performed.

In case of using the water soluble organic solvent instead of the acid, the heating temperature is different depending on the kind of the organic solvent and its boiling point. Although the preferable temperature cannot be unconditionally mentioned, for example, the temperature about 80° C. to 240° C. is preferable and about 120° C. to 240° C. is more preferable.

When the heating temperature for the heated water-soluble organic solvent is low, since Si—O—Si is not bridged on the glass surface, the quality of the glass substrate is apt to change. When the heating temperature exceeds 300° C., K ions in the glass substrate move to the inside the substrate, so the strength of the glass substrate deteriorates.

When the heating temperature for the heated water soluble organic solvent exceeds 100° C., the ability to prevent the change in quality of the glass substrate is increasingly improved. There is also an effect on the removal of the precipitated fused salt.

The processing time by the heated water-soluble organic solvent is preferably about 1 minute to 1 hour.

As water-soluble organic solvents, for example, glycerol, polyethylene glycol, and the like can be mentioned. Polyethylene glycol having the molecular weight of about few tens to few hundreds is preferable.

The process by using the heated water-soluble organic solvent is performed by, for example, immersing the glass substrate in a heated water-soluble organic solvent. In this case, the process can be also executed while applying supersonic waves. The glass substrate to be immersed in is sufficiently dried and it is preferable to remove water or the like.

In the process using the heated water-soluble organic solvent, it is also possible that a plurality of processing vessels of the same water soluble organic solvent or different water soluble organic solvents are provided and the glass substrate is sequentially immersed. In this case, the temperature and the concentration of the water soluble organic solvent can be varied.

After the process using the heated water-soluble organic solvent, the process using the heated acid (for example, the thermal concentrated sulfuric acid, sulfuric acid, phosphoric acid, or the like at a temperature over 100° C.) or a known cleaning process can be also performed such as cleaning using a commercially available cleaning agent (neutral detergent, surface active agent, alkaline cleaning agent, or the like), scrubbing cleaning, pure water cleaning, solvent cleaning, solvent steam drying, centrifugation drying, or the like. In each cleaning, heating or application of supersonic waves may be performed.

With respect to the supersonic waves, either those of a multi-frequency type of oscillating in a certain frequency range or of a fixed frequency type of oscillating at a predetermined frequency can be used. The lower the frequency is, the higher the cleaning effect is. However, as the frequency is lowered, the damage given to the glass substrate becomes large, so the frequency is determined in consideration of the above.

Since the drying speed of the steam drying is fast, a stain does not easily occur by the drying. As solvents used for the steam drying, isopropyl alcohol, fleon, acetone, methanol, ethanol, and the like can be mentioned.

The glass substrate is not especially limited as long as it is ion exchangeable. The size, thickness, and the like of the glass substrate are not especially limited.

As materials of the glass substrate, for example, aluminosilicate glass, soda-lime glass, soda-aluminosilicate glass, aluminoborosilicate glass, borosilicate glass, silica glass, chain-silicate glass, and the like can be mentioned.

Aluminosilicate glass is especially preferable since it is not so included by an acid process and it has excellent shock resistance and vibration proof.

As aluminosilicate glass, a glass for chemical strengthening containing $SiO_2$ of 62 to 75 wt %, $Al_2O_3$ of 5 to 15 wt %, $Li_2O$ of 4 to 10 wt %, $Na_2O$ of 4 to 12 wt %, and $ZrO_2$ of 5.5 to 15 wt % as main components, in which the weight ratio of $Na_2O/ZrO_2$ is 0.5:2.0 and that of $Al_2O_3/ZrO_2$ is 0.4:2.5; a glass for chemical strengthening containing $SiO_2$ of 62 to 75 wt %, $Al_2O_3$ of 5 to 15 wt %, $B_2O_3$ of 0.5 to 5 wt %, $Li_2O$ of 4 to 10 wt %, $Na_2O$ of 4 to 12 wt %, MgO of 0.5 to 5 wt %, CaO of 0.5 to 5 wt %, and $Sb_2O_3$ of 0.01 to 1.0 wt % as main components; and the like are preferable.

It is preferable to use a glass for chemical strengthening containing $SiO_2$ of 57 to 74 mol %, $ZnO_2$ of 0 to 2.8 mol %, $Al_2O_3$ of 3 to 15 mol %, $LiO_2$ of 7 to 16 mol %, and $Na_2O$ of 4 to 14 mol % in order to remove projections on the glass substrate surface occurring due to unsolved substances of $ZrO_2$.

By chemically strengthening the aluminosilicate glass having a such composition, the three of compressive stress, tensile stress, the depth of the compressive stress layer can be controlled in a well-balanced manner, excellent transverse strength, heat resistance, and Knoop hardness are obtained, Na or the like is hardly precipitated even under an environment at a high temperature, and the flatness is maintained.

The method of fabricating the glass substrate for a magnetic disk according to the invention can be also used as a method of processing an electron-optical disk substrate such as a glass substrate for a magnetooptic disk, an optical memory disk which is easily affected by abnormal projection, fine defect, and the change in quality of the glass substrate, and a processing method of changing the quality of the surface.

A method of fabricating a magnetic disk of the invention will be described hereinbelow.

The method of fabricating the magnetic disk of the invention is characterized in that at least a magnetic layer is formed on the glass substrate for the magnetic disk obtained by using the above-mentioned method of fabricating the glass substrate for the magnetic disk.

According to the invention, since the glass substrate having no burning or the like on the surface is used, the magnetic disk has accordingly high quality. That is, by using the glass substrate having the surface in a much better state as compared with a conventional surface, when the magnetic disk is formed by using such a glass substrate, head crush caused by foreign matters by burning or the like does not occur, and defect due to a defect on a film such as the magnetic layer which causes an error does not occur.

Since the glass substrate for the magnetic disk which can prevent the change in quality of the glass surface at a high level is used, a very-reliable long-life magnetic disk having excellent weather resistance can be fabricated.

A magnetic recording medium is generally fabricated by sequentially forming an undercoating layer, a magnetic layer, a roughness formation layer, a protective layer, a lubricant layer, and the like in accordance with necessity on the glass substrate for the magnetic disk.

The undercoating layer in the magnetic recording medium is properly selected according to the magnetic layer.

The undercoating layer can be made of at least one kind of material selected from non-magnetic metals such as Cr, Mo, Ta, Ti, W, V, B, Al, and the like. In case of using the magnetic layer containing Co as a main component, the simple substance of Cr or a Cr alloy is preferable from the viewpoint of improvement of the magnetic characteristics or the like. The undercoating layer is not limited to be a single layer but can have a plural layer structure in which the same or different kinds of layers are laminated. For instance, multi-undercoating layers such as Cr/Cr, Cr/CrMo, Cr/CrV, CrV/CrV, Al/Cr/CrMo, Al/Cr/Cr, and the like can be mentioned.

Materials of the magnetic layer are not limited.

As magnetic layers, specifically, magnetic thin layers made of materials each containing Co as a main component such as CoPt, CoCr, CoNi, CoNiCr, CoCrTa, CoPtCr, CoNiPt, CoNiCrPt, CoNiCrTa, CoCrPtTa, CoCrPtSiO, and the like can be mentioned. The magnetic layer may also have a multi-layer structure (for instance, CoPtCr/CrMo/CoPtCr, CoCrTaPt/CrMo/CoCrTaPt, or the like) to reduce noises by sandwiching a non-magnetic film (for example, Cr, CrMo, CrV, or the like) by the magnetic layers.

The magnetic layer can be made of, in addition to the above-mentioned materials containing Co, ferritic materials, iron-rare earth materials, a granular film in which magnetic particles such as Fe, Co, CoFe, CoNiPt, or the like are dispersed in a non-magnetic layer made of $SiO_2$, BN, or the like. The magnetic layer can be of either a longitudinal type or a vertical type.

The roughness formation layer is provided to control the roughness of the medium surface. A forming method, materials, and the like of the roughness formation layer are not especially limited. A forming position of the roughness formation layer is not also especially limited.

In case of a magnetic recording medium for a magnetic disk drive of a non-contact type recording system, the roughness caused by the roughness of the roughness formation layer is formed on the medium surface in order to prevent absorption of a magnetic head and the magnetic recording medium by the roughness formed on the medium surface, thereby to improve the CSS durability.

In case of a magnetic recording medium for a magnetic disk device of a contact type recording system, since the medium surface is preferred to be as smooth as possible in order to avoid damaging the magnetic head or the magnetic recording medium, the roughness formation layer is unnecessary.

The surface roughness of the roughness formation layer is preferably Ra=10 to 50 angstrom. More preferable range is Ra=10 to 30 angstrom.

It is not preferable when Ra is below 10 angstrom, because the surface of the magnetic recording medium is almost flat, the magnetic head and the magnetic recording medium are absorbed and damaged, or a head crush due to the absorption occurs and the magnetic head and the magnetic recording medium are fatally damaged. It is also not preferable when Ra exceeds 50 angstrom, because the glide height is increased, causing reduction in the recording density.

Various materials and forming methods of the roughness formation layer are known, which are not especially limited.

As materials of the roughness formation layer, metals Al, Ti, Cr, Ag, Nb, Ta, Bi, Si, Zr, Cu, Ce, Au, Sn, Pd, Sb, Ge, Mg, In, W, Pb, and the like and its alloys, and oxides, nitrides, and carbides of the metals and alloys can be used. From the viewpoint of easy formation or the like, it is preferable that the materials are the simple substance of Al, Al alloys, or metals containing Al as a main component such as Al oxide, Al nitride ($Al_2O_3$ or the like), and Al carbide (such as AlN).

The roughness formation layer can be a continuous texture film or constructed by discreetly distributing island-state projections. The height of the island-like projection is preferably 100 to 500 angstrom and more preferably 100 to 300 angstrom.

The surface roughness and the height of the roughness (projections) of the roughness formation layer can be controlled by the material of the unevenness formation layer, the composition, conditions of the heat treatment, and the like.

As other roughness formation methods, a texture process by mechanical polishing, a texture process by chemical etching, a texture process by irradiation of an energy beam, and the like can be mentioned. The methods can be also combined.

As protective layers, for example, a Cr film, a Cr alloy film, a carbon film, a zirconia film, a silica film, and the like can be mentioned. The films can be formed continuously to the undercoating layer, the magnetic layer, and the like by an in-line or stationary facing sputtering system. The protective layer can have a single layer structure or a multilayer structure consisting of the same or different kinds of films.

Another protective layer can be also formed on the above-mentioned protective layer or instead of the above-mentioned protective layer. For example, in place of the above protective layer, a silicon oxide ($SiO_2$) film may be formed by applying and further baking a solvent obtained by dispersing colloidal silica particles in a solvent derived by diluting tetraalkoxysilane with an alcohol solvent. In this case, the film has both of functions of the protective layer and the roughness formation layer.

Various lubricant layers have been proposed. Generally, the lubricant layer is formed by applying a liquid lubricant agent made of perfluoropolyether (PFPE) or the like on the medium surface by immersing, spin coating, spraying, or the like and by performing a heating process in accordance with necessity.

The invention will be further specifically described hereinbelow on the basis of embodiments.

The method of fabricating the glass substrate for the magnetic disk according to the embodiments can be roughly divided into (1) grinding and polishing step, (2) chemically strengthening step, (3) cooling step, and (4) processing step using the heated acid or water soluble organic solvent.

In the following description, embodiments 1 to 9 relate to the case where the heated acid is used in the (4) processing step and embodiments 10 to 20 relate to the case where the heated water soluble organic solvent is used.

(1) Grinding and Polishing Step

First, a sheet glass made of an aluminosilicate glass is formed by a dissolving formation method. As an aluminosilicate glass, a glass for chemical strengthening containing $SiO_2$ of 57 to 74 mol %, $ZnO_2$ of 0 to 2.8 mol %, $Al_2O_3$ of 3 to 15 mol %, $LiO_2$ of 7 to 16 mol %, and $Na_2O$ of 4 to 14 mol % as main components is used.

A glass is cut in a disk shape from the sheet glass by using a grinding wheel. The surface and back surface are ground by sanding. The central part of the glass substrate is opened in the disk shape, the inner and outer circumferential faces of the hole opened by the grinding wheel are polished to determine the outer and inner diameters and the inner and outer circumferential faces are chamfered. Lastly in the grinding step, a precision polishing is performed to both of the surface and the back surface, thereby finishing. A disk-shaped glass substrate is consequently obtained.

(2) Chemically Strengthening Step

The glass substrate after the grinding and polishing step is cleaned and the resultant substrate is chemically strengthened.

The chemically strengthening process is performed as follows. A chemically strengthening treatment liquid obtained by mixing potassium nitrite (60%) and sodium nitrate (40%) is prepared and is heated to 400° C. The cleaned glass substrate preheated to 300° C. is immersed in the liquid for about three hours. When the substrate is immersed, a plurality of glass substrates are housed in a holder with the end faces held so that the whole surface of each glass substrate is chemically strengthened.

By immersing the substrate into the chemically strengthening treatment liquid, sodium ions and potassium ions in the chemically strengthening treatment liquid are substituted for lithium ions and sodium ions in the surface layer of the glass substrate, respectively. Thus, the glass substrate is strengthened.

The thickness of the compressive stress layer formed on the surface layer of the glass substrate is about 100 to 200 $\mu$m.

(3) Cooling Step

The chemically strengthened glass substrate is gradually cooled sequentially in first and second gradually cooling chambers. First, the glass substrate is withdrawn from the chemically strengthening treatment liquid, transferred to the first gradually cooling chamber which is heated to 300° C., and held in the chamber for about 10 minutes so as to be gradually cooled to 300° C. Subsequently, the glass substrate is transferred from the first gradually cooling chamber to the second gradually cooling chamber which is heated to 200° C. The glass substrate is gradually cooled from 300° C. to 200° C.

By gradually cooling the glass substrate at two stages, the glass substrate can be prevented from being damaged due to thermal distortion.

The gradually cooled glass substrate is immersed and quickly cooled in water at 20° C. in a water vessel and held for about 20 minutes.

(4) Processing Step Using Heated Acid

The glass substrate after the cooling step is subjected to the process using the heated acid by being immersed in the thermal concentrated sulphuric acid heated to about 200° C. having the concentration of 96 wt % for five minutes. The removal of the precipitated fused salt and the process for preventing the change in quality of the glass substrate are simultaneously performed.

The glass substrate is sequentially immersed in cleaning vessels of the neutral detergent, neutral detergent, pure water, pure water, IPA (isopropyl alcohol), and IPA (steam drying) and is cleaned. Supersonic waves (frequency of 40 kHz) are applied to each cleaning vessel.

When the surface of the glass substrate for the magnetic disk fabricated by the above steps was examined by a microscope, no burning larger than 5 $\mu$m due to the alkali ion elution was found. On the contrary, on the surface of the glass substrate which was not processed with the heated acid, few tens to few hundreds of burning each having the size larger than 5 $\mu$m were recognized.

A high-temperature and high-humidity environment test at the temperature of 85° C. and the humidity of 85% was performed for 120 hours. The change in quality of the glass substrate surface such as burning was not recognized.

(5) Magnetic Disk Fabricating Step

On each of both faces of the glass substrate for the magnetic disk obtained by the above steps, a Cr undercoating layer, a CrMo undercoating layer, a CoPtCr magnetic layer, and a C protective layer are sequentially formed by using the in-line sputtering system, thereby obtaining a magnetic disk.

When the weather resistance and the life of the obtained magnetic disk was examined, degradation or defect of the magnetic film or the like caused by the change in quality of the glass substrate surface were not recognized.

When the glide test was performed to the obtained magnetic disk, hit (the head hits the projection of the magnetic disk surface) or crash (the head crashes to the projection of the magnetic disk surface) was not recognized. No occurrence of the defect on the layers such as the magnetic layer could be also confirmed.

Embodiment 2

A glass substrate for a magnetic disk and a magnetic disk were obtained in a manner similar to the embodiment 1 except that the glass substrate was immersed in sulfuric acid heated to about 120° C. having the concentration of 8 wt % for 20 minutes and the acid process was performed while applying supersonic waves (frequency of 40 kHz).

As a result, effects almost similar to those of the embodiment 1 were obtained.

Embodiment 3

A glass substrate for a magnetic disk and a magnetic disk were obtained in a manner similar to the embodiment 1 except that instead of the sulfuric acid cleaning, the substrate was immersed in phosphoric acid heated to about 40° C. having the concentration of 10 wt % for two minutes and the acid process was performed while applying supersonic waves (frequency of 32 kHz).

As a result, effects slightly less than those of the sulfuric acid cleaning were obtained.

Embodiments 4 and 5

A glass substrate for a magnetic disk and a magnetic disk were obtained in a manner similar to the embodiments 2 and 3 except that hydrogen peroxide having the concentration of 35 wt % was added to the acids.

As a result, effects similar to those in the embodiments 2 and 3 were obtained.

Embodiments 6 and 7

A glass substrate for a magnetic disk and a magnetic disk were obtained in a manner similar to the embodiment 1 except for using a soda lime glass (embodiment 6) or soda aluminosilicate glass (embodiment 7) in place of the aluminosilicate glass.

As a result, although the compressive stress layer was shallower than that of the aluminosilicate glass, there was no problem practically.

Embodiment 8

On each of both faces of the glass substrate for the magnetic disk obtained in the embodiment 1, an undercoating layer made of Al (film thickness of 50 angstrom)/Cr (1000 angstrom)/CrMo (100 angstrom), a magnetic layer made of CoPtCr (120 angstrom)/CrMo (50 angstrom)/CoPtCr(120 angstrom), and a protective layer of Cr (50 angstrom) were formed by the in-line sputtering system.

The substrate was immersed in an organosilicic compound solution in which silica particles (the particle diameter of 100 angstrom) were dispersed and was baked, thereby forming a protective layer made of $SiO_2$. Further, a dipping process was performed on the protective layer with a lubricant agent made of perfuoropolyether. thereby forming a lubricant layer. A magnetic disk for an MR head was consequently obtained.

When the weather resistance and the life was examined, no degradation or defect of the magnetic layer or the like caused by the change in quality of the surface of the glass substrate was recognized.

When the gliding test is performed to the obtained magnetic disk, no hit or crash was recognized. No occurrence of a defect in the films such as the magnetic layer could be also confirmed.

Embodiment 9

A magnetic disk for a thin film head was obtained in a manner similar to the embodiment 7 except that the undercoating layer was made of Al/Cr/Cr and the magnetic layer was made of CoNiCrTa.

Similar effects as those of the embodiment 8 with respect to the magnetic disk were confirmed.

Embodiment 10

In a manner similar to the steps of the embodiment 1, (1) grinding and polishing step, (2) chemically strengthening step, and (3) cooling step were performed.

A process using the heated water soluble organic solvent was performed by immersing the glass substrate after the cooling step in glycerol heated to about 120° C., for thirty minutes, thereby preventing the change in quality of the glass surface.

Then, the glass substrate was cleaned by sequentially being immersed in cleaning vessels of neutral detergent, neutral detergent, pure water, pure water, IPA (isopropyl alcohol), and IPA (steam drying). Supersonic waves (frequency of 40 kHz) were applied to each cleaning vessel.

When the surface of the glass substrate for the magnetic disk fabricated by the above steps was examined by a microscope, no burning larger than 5 $\mu$m due to the alkali elution was not found. On the contrary, on the surface of one which was not subjected to the process using the heated water soluble organic solvent, tens to hundreds of burning each having the size of 5 $\mu$m or larger were recognized.

When the high-temperature high-humidity environment test at the temperature of 85° C. and the humidity of 85% was performed for 120 hours, the change in quality of the glass substrate surface such as burning was not recognized.

On each of both faces of the glass substrate for the magnetic disk obtained by the above steps, a Cr undercoating layer, a CrMo undercoating layer, a CoPtCr magnetic layer, and a C protective layer were sequentially formed by using the in-line sputtering system, thereby obtaining the magnetic disk.

When the weather resistance and the life of the obtained magnetic disk were examined, no degradation nor defect of the magnetic film or the like caused by the change in quality of the glass substrate surface was found.

When the glide test was performed to the derived magnetic disk, hit (the head hits the projection of the magnetic disk surface) or crash (the head crashes the projection of the magnetic disk surface) was not recognized. No occurrence of the defect in the layer such as the magnetic layer could be also confirmed.

Embodiment 11

In a manner similar to the embodiment 10 except for immersing the glass substrate in glycerol heated to about 160° C., for ten minutes, a glass substrate for a magnetic disk and a magnetic disk were obtained.

As a result, effects similar to those of the embodiment 10 were obtained.

Embodiment 12

In a manner similar to the embodiment 10 except that a process was performed by immersing the substrate in glycerol heated to about 240° C., for five minutes, a glass substrate for a magnetic disk and a magnetic disk were obtained.

As a result, effects similar to those of the embodiment 10 were obtained.

Embodiment 13

In a manner similar to the embodiment 10 except that a process was performed by immersing the substrate in polyethylene glycol (molecular weight of 600) at about 160° C., for ten minutes instead of glycerol, a glass substrate for a magnetic disk and a magnetic disk were obtained.

As a result, effects almost similar to those of the embodiment 10 were obtained.

Embodiments 14 to 18

In a manner similar to the embodiments 10 to 13 except that a process using the heated acid was performed after the process using the heated water soluble organic solvent, glass substrates for magnetic disks and magnetic disks were obtained.

As a result, effects similar to those of the embodiments 10 to 13 were obtained. Also, the precipitated fused salt was not recognized.

Embodiment 19

On each of the faces of the glass substrate for the magnetic disk obtained in the embodiment 10, an undercoating layer made of Al (film thickness of 50 angstrom)/Cr (1000 angstrom)/CrMo (100 angstrom), a magnetic layer made of CoPtCr (120 angstrom)/CrMo (50 angstrom)/ CoPtCr (120 angstrom), and a protective layer made of Cr (50 angstrom) were formed by the in-line sputtering system.

The substrate was immersed in the organosilicic compound solution (liquid of mixture of water, IPA, and tetraethoxysilane) in which silica particles (having the particle diameter of 100 angstrom) were dispersed and the substrate was baked, thereby forming the protective layer made of $SiO_2$. Further, the immersing process was performed on the protective layer with the lubricant agent made of perfluoropolyether, to thereby form a lubricant layer. Consequently, a magnetic disk for an MR head was obtained.

When the weather resistance and the life was examined, the degradation or defect of the magnetic layer or the like caused by the change in quality of the surface of the glass substrate was not recognized.

Further, when the glide test was performed to the derived magnetic disk, no hit nor crush was recognized. No occurrence of the defect in the films such as the magnetic layer could be also confirmed.

Embodiment 20

A magnetic disk for a thin-film head was obtained in a manner similar to the embodiment 16 except that an undercoating layer of Al/Cr/Cr and a magnetic layer of CoNiCrTa were used.

With respect to the magnetic disk, effects similar to those in the embodiment 19 were confirmed.

Comparison Example 1

A glass substrate for a magnetic disk and a magnetic disk were obtained in a manner similar to the embodiment 1 except that the glass substrate after the cooling step was immersed for 5 hours in warm water at 97° C. instead of the heated acid.

Comparison Example 2

A glass substrate for a magnetic disk and a magnetic disk were obtained in a manner similar to the embodiment 10 except that the process using the heated water soluble organic solvent was not performed.

When the surface of the glass substrate for the magnetic disk was examined by a microscope in a manner similar to the embodiment 1, tens to hundreds of the burning each having the size of 5 μm or larger were recognized.

When the weather resistance and the life of the derived magnetic disk was examined, the degradation and defect of the magnetic film or the like caused by the changes in quality of the surface of the glass substrate was recognized.

Further, when the glide test was executed to the obtained magnetic disk, the hit and crash was recognized.

Although the invention has been described by the preferred embodiments, the invention is not always limited to the embodiments.

For example, the concentration, heating temperature, kind, immersing time, and the like of the heated acid or the water soluble organic solution are not limited to those in the embodiments but can be properly changed in accordance with the demanded quality level or the like.

What is claimed is:

1. A method of fabricating a glass substrate for a magnetic disk, comprising the steps of:

chemically strengthening a glass substrate by immersing the glass substrate in a heated chemically strengthening treatment liquid, and performing an ion exchange of exchanging ions in a surface layer of the glass substrate for ions in the chemically strengthening treatment liquid; and processing the surface of the glass substrate withdrawn from the chemically strengthening treatment liquid by immersing the glass substrate in a sulfuric acid having 50 wt. % or higher concentration heated to a temperature at which elution of alkali ions near the surface of the glass substrate is suppressed.

2. The method according to claim 1, wherein the heating temperature of the heated acid lies in a range from over 100° C. to 300° C.

3. The method according to claim 1, wherein a processing time with the heated acid is from one minute to two hours.

4. The method according to claim 1, wherein the heated acid is either a thermal concentrated sulphuric acid, a thermal concentrated sulfuric acid at over 100° C. having the concentration of 96%, or an acid including sulfuric acid and/or phosphoric acid.

5. The method according to claim 4, wherein the sulfuric acid and/or phosphoric acid include(s) hydrogen peroxide.

6. The method according to claim 1, wherein the step of chemically strengthening the glass substrate includes steps of:

(i) heating the chemically strengthening treatment liquid to a temperature of a melting point of salt or higher;

(ii) immersing the substrate into the chemically strengthening treatment liquid for a predetermined period;

(iii) withdrawing the glass substrate from the liquid;

(iv) cooling the substrate gradually to a temperature in the range of from 300° C. to 150° C.; and (v) cooling the substrate quickly by contact with a refrigerant.

7. A method of fabricating a magnetic disk, comprising the steps of:

preparing a glass substrate for a magnetic disk obtained by using the method as set forth in claim 1; and forming a magnetic layer on a surface of the glass substrate.

8. A method of fabricating a glass substrate for an information recording medium which comprises:

(a) exchanging Na+ ions of non-crosslinked Si—O—Na present on the surface of the glass substrate for hydronium ions generated from water contained in a treating solution thereby forming a silanol group, by contacting the glass substrate with the treating solution and thereafter (b) forming crosslinked Si—O—Si to inhibit further dissolving out of ions contained in the glass substrate by heating the glass substrate to dehydrate the silanol group to form crosslinked Si—O—Si.

9. A method of fabricating a glass substrate for a magnetic disk, comprising steps of:

chemically strengthening a glass substrate by immersing the glass substrate in a heated chemically strengthening treatment liquid, and performing an ion exchange of exchanging ions in a surface layer of the glass substrate for ions in the chemically strengthening treatment liquid; and processing the surface of the glass substrate withdrawn from the chemically strengthening treatment liquid with a sulfuric acid having 50 wt. % or higher concentration heated to a temperature in a range between 100° C. and 300° C.

10. The method according to claim 9, wherein a processing time with the acid heated is from one minute to two hours.

11. The method according to claim 9, wherein the acid is either a thermal concentrated sulfuric acid, a thermal concentrated sulfuric acid at 100° C. having a concentration of 96%, or an acid including a sulfuric acid and/or phosphoric acid.

12. The method according to claim 11, wherein the sulfuric acid and/or phosphoric acid include(s) a hydrogen peroxide.

13. The method according to claim 9, wherein the step of chemically strengthening a glass substrate includes steps of:

(i) heating the chemically strengthening treatment liquid to a temperature of a melting point of salt or higher;

(ii) immersing the substrate into the chemically strengthening treatment liquid for a predetermined period;

(iii) withdrawing the substrate from the liquid;

(iv) cooling the substrate gradually to a temperature in a range between 150° C. and 300° C.; and (v) cooling the substrate quickly by contacting with a refrigerant.

14. A method of fabricating a magnetic disk, comprising steps of:

preparing a glass substrate for a magnetic disk obtained by using the method as set forth in claim 9; and forming a magnetic layer on a surface of the glass substrate.

* * * * *